United States Patent
Wolf et al.

(10) Patent No.: US 11,780,255 B2
(45) Date of Patent: Oct. 10, 2023

(54) ANTIMONY FREE COMPOSITION FOR LASER MARKING THERMOPLASTIC COMPOUNDS

(71) Applicant: CLARIANT PLASTICS & COATINGS LTD, Muttenz (CH)

(72) Inventors: Jürgen Wolf, Ahrensburg (DE); Chun Yip Pang, Hamburg (DE)

(73) Assignee: Clariant Plastics & Coatings Ltd, Muttenz (CH)

(*) Notice: Subject to any disclaimer, the term of this patent is extended or adjusted under 35 U.S.C. 154(b) by 887 days.

(21) Appl. No.: 16/486,854

(22) PCT Filed: Feb. 20, 2018

(86) PCT No.: PCT/EP2018/054058
§ 371 (c)(1),
(2) Date: Aug. 19, 2019

(87) PCT Pub. No.: WO2018/150033
PCT Pub. Date: Aug. 23, 2018

(65) Prior Publication Data
US 2021/0129570 A1    May 6, 2021

(30) Foreign Application Priority Data
Feb. 20, 2017  (EP) .................................. 17156822

(51) Int. Cl.
*B41M 5/26*   (2006.01)
*C01G 29/00*  (2006.01)
(Continued)

(52) U.S. Cl.
CPC ............ *B41M 5/267* (2013.01); *B41M 5/262* (2013.01); *C01G 29/00* (2013.01); *C01G 49/0018* (2013.01); *C08K 3/22* (2013.01)

(58) Field of Classification Search
CPC ............ B29B 7/72; B41M 5/26; C01G 29/00
See application file for complete search history.

(56) References Cited

U.S. PATENT DOCUMENTS

| 4,816,374 A | 3/1989 | Lecomte |
| 6,214,917 B1 | 4/2001 | Linzmeier et al. |

(Continued)

FOREIGN PATENT DOCUMENTS

| CN | 1359969 A   | 7/2002 |
| CN | 102686408 A | 9/2012 |

(Continued)

OTHER PUBLICATIONS

Office Action issued in corresponding Japanese Patent Application No. 2019-544040, dated Sep. 14, 2022.

(Continued)

*Primary Examiner* — Khanh T Nguyen
(74) *Attorney, Agent, or Firm* — Morgan, Lewis & Bockius LLP

(57) ABSTRACT

It has been found, that when co-absorbing substances are added to intrinsic laser-absorbing bismuthoxide, the marking performance with a Nd.YAG-laser is improved or at least kept at the same level by reducing the costs. It is suspected, that the co-absorbing additive is not simply adding a contrast to the polymer by carbonizing the surrounding polymer but helping the bismuthoxide to couple the laser radiation and to ease the color change of this additive. This so found effect helps to cheapen the replacement of antimony trioxide and therewith have a safer and more sustainable solution for the current and future technology of laser marking.

11 Claims, 1 Drawing Sheet

(51) Int. Cl.
  *C01G 49/00* (2006.01)
  *C08K 3/22* (2006.01)

(56) References Cited

U.S. PATENT DOCUMENTS

| | | | |
|---|---|---|---|
| 6,503,316 | B1 | 1/2003 | Sakoske et al. |
| 7,217,745 | B2 | 5/2007 | Edler |
| 8,790,769 | B2 | 7/2014 | Prissok et al. |
| 9,637,651 | B2 | 5/2017 | Matoda et al. |
| 9,890,287 | B2 | 2/2018 | Kniess et al. |
| 10,202,216 | B2 | 2/2019 | Fushimi |
| 2011/0165381 | A1 | 7/2011 | Prissok et al. |
| 2016/0168399 | A1* | 6/2016 | Matoda ............... B23K 26/18 428/206 |

FOREIGN PATENT DOCUMENTS

| | | | | |
|---|---|---|---|---|
| CN | 103951945 A | * | 7/2014 | ............... B29B 7/72 |
| CN | 103951946 A | | 7/2014 | |
| CN | 105246638 A | | 1/2016 | |
| CN | 105330898 A | * | 2/2016 | ............... C08K 3/08 |
| CN | 105330898 A | | 2/2016 | |
| DE | 102014000359 A1 | | 7/2015 | |
| EP | 0697433 B1 | | 8/2003 | |
| EP | 1190988 B1 | | 9/2008 | |
| EP | 3000553 A1 | | 3/2016 | |
| JP | H10-224041 A | | 8/1998 | |
| JP | 2002-206062 A | | 7/2002 | |
| RU | 2035055 C1 | | 5/1995 | |
| WO | 2006/065611 A1 | | 6/2006 | |
| WO | 2012/077453 A | | 6/2012 | |
| WO | 2014/188828 A1 | | 11/2014 | |

OTHER PUBLICATIONS

International Search Report and Written Opinion issued in corresponding International Patent Application No. PCT/EP2018/054058, dated Mar. 21, 2018.
Office Action issued in corresponding Argentina Patent Application No. 20180100384, dated Aug. 13, 2021.
Preliminary Office Action issued in corresponding Brazil Patent Application No. 112019014947-3, dated Jul. 7, 2022.
Office Action issued in corresponding China Patent Application No. 201880012274.9, dated Jun. 11, 2021.
Office Action issued in corresponding Europe Patent Application No. 18705155.2, dated Oct. 2, 2019.
Office Action issued in corresponding India Patent Application No. 201917032149, dated Apr. 29, 2021.
Office Action issued in corresponding Indonesia Patent Application No. PID201906070, dated Sep. 4, 2021.
Translation of Office Action issued in corresponding Japanese Patent Application No. 2019-544040, dated Nov. 24, 2021.
Office Action issued in corresponding Korea Patent Application No. 10-2019-7027709, dated Jul. 5, 2022.
Office Action issued in corresponding Russia Patent Application No. 2019129468, dated Mar. 25, 2021.
Written Opinion issued in corresponding Singapore Patent Application No. 11201906568W, dated Jul. 27, 2020.
Examination Report issued in corresponding Singapore Patent Application No. 11201906568W, dated Dec. 13, 2021.
Office Action issued in corresponding Taiwan Patent Application No. 107103242, dated Jun. 24, 2021.

* cited by examiner

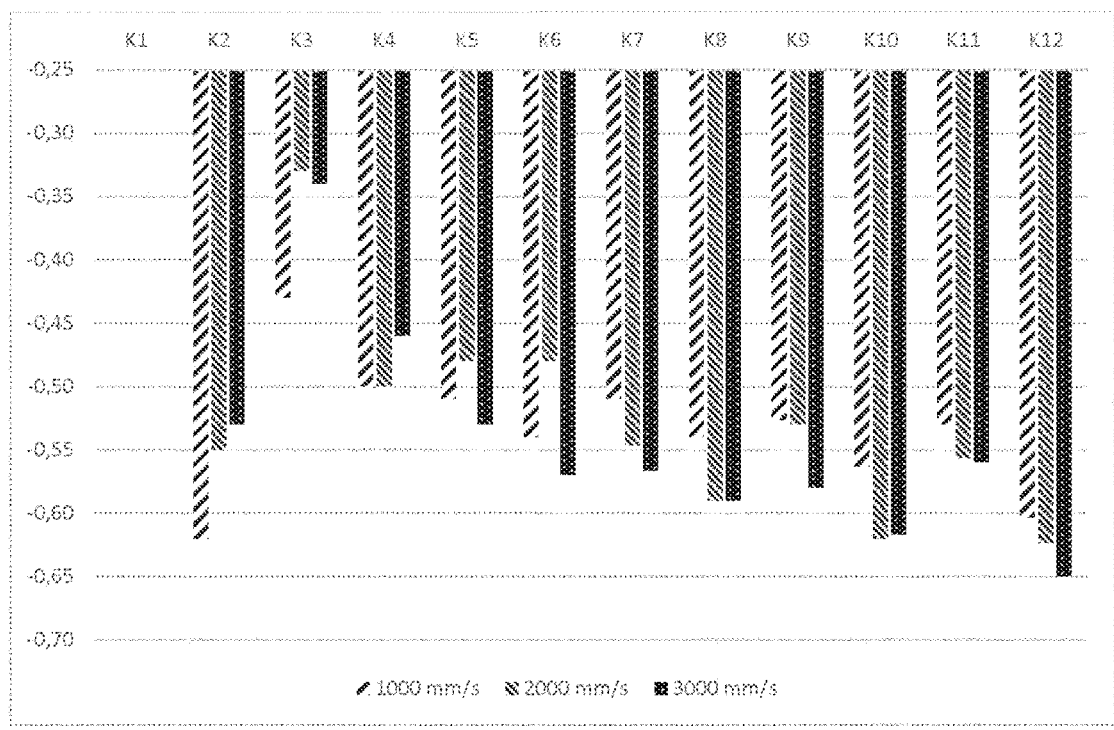
Diagram 1: K-values of testcompounds

ANTIMONY FREE COMPOSITION FOR LASER MARKING THERMOPLASTIC COMPOUNDS

FIELD OF THE DISCLOSURE

This invention relates to a laser-markable plastic composition which is free of antimony.

BACKGROUND OF THE DISCLOSURE

In many plastics applications a marking of the manufactured end product is required. Whether is it food packaging, where shelf life or the producer has to be indicated, or electronic parts, where a type description or serial number has to be added. Today consumers as well as the industry want transparency and traceability all through the value chain, especially when sustainable sourcing and production are desired.

When thermoplastics have to be marked, todays preferred technology is contact free laser marking. In difference to ink based pad printing, laser marking is solvent and contact free, imparts excellent flexibility and speed.

For laser marking different types of materials and laser technologies are available.

For the laser marking of plastics, a Nd:YAG system with a frequency of 1064 nm is commonly used, because it is cheap and flexible. However, not all plastics are coupling the laser with the same absorption capacity within the issued wavelength. Therefore, laser-marking additives are required to boost the markability of thermoplastics that are not inherently laser markable, such as, for example, polycarbonates. Polymers like polyolefines or thermoplastic urethanes need additional additives to deliver the right laser marking result in contrast and edge sharpness. Laser marking additives are normally incorporated into the polymer by diluting an additive or color concentrate (Masterbatch) in the polymer.

In general, laser-marking additives work in two different modes of action: intrinsic and non-intrinsic working additives.

Non-intrinsic additives absorb the energy of the laser and transfer it to the surrounding polymer matrix. Depending on the feedback of the polymer, the polymer can either carbonize, which normally leads to a brownish or greyish contrast on the surface of the polymer, or the polymer degrades to short length molecules and monomers that tend to vaporize at the surface and generate a foam. This results in bright marking caused by different refractive indices at the interface between the different solid phases. The laser marking can also be a result of both mechanisms.

Intrinsic additives are working by changing its own chemical structure. For example, commonly used antimony trioxide $Sb_2O_3$ reduces to antimony Sb that has a dark color to provide a sufficient contrast of the marking. Intrinsic laser-marking additives should be dispersed inside the polymeric matrix with good homogeneity, so that the edge sharpness normally is better than when using non-intrinsic additives.

However, there is a need to replace antimony trioxide as a laser-marking additive because of it is toxic profile. It is classified as dangerous for health and environment and has to be labelled as harmful to health according to Regulation (EC) No. 272/2008.

An especially important aspect is the use of laser-marking additives for the marking of ear cattle tags. Today, antimony trioxide is the preferred additive for the marking of such products. However, antimony trioxide has a non-environmental friendly profile and is therefore a potential candidate to be substituted by other solutions that the marking is seeking for. Due to the lack of alternatives, antimony trioxide or antimony containing additives are still the majority of additives that are used for this purpose.

U.S. Pat. No. 4,816,374 (Lecomte) discloses the use of antimony oxide as a laser radiation opacifier substance in a polyurethane plastic material to satisfy French standard (number NF-T-54006) for abrasion in order to make and use ear tags for livestock animals. However, it is not preferred to use heavy metals such as antimony in thermoplastic compounds for healthy and safety reasons. Indeed, antimony is still being studied regarding health problems that it might induce in mammals.

U.S. Pat. No. 6,214,917 (Linzmeier et al.) discloses thermoplastic polyurethanes as laser-markable plastics. The TPU's contain pigments having a coating of tin dioxide thereon, which coating is doped with 0.5-20% by weight of antimony, arsenic, bismuth, copper, gallium, germanium, or a corresponding oxide thereof.

EP-0697433 B1 describes the use of copper salts for the purpose of laser marking. It is well known that e.g. copper hydroxy phosphate has a high efficiency in high contrast laser marking. Nevertheless, for the application of ear cattle tags for example there is a limited utility because the copper hydroxy phosphate is able to react with animal faeces and cause a color change.

EP-1190988 B1 claims the use of Bismuth containing compounds as a substitute of antimony trioxide for the purpose of a laser marking opacifier. However the effect is a lower performance in contrast compared to $Sb_2O_3$ and also more expensive.

In DE-102014000359 A1 pigments based on bismuth compounds and the use thereof, preferably as a laser-absorbing additive, and a method for their preparation are claimed. However the manufacturing of such compounds is complex and expensive. To have a suitable replacement for antimony trioxide, the costs may not be much higher.

Therefore, a need exists to provide a low-cost, environmentally and toxicologically friendly laser-markable plastic, which is free from antimony, and which provides a good contrast after laser treatment.

SUMMARY OF THE DISCLOSURE

Surprisingly it was found that an addition of particular co-absorbing additives to an intrinsic laser markable bismuth oxide can boost the laser marking result yielding a high contrast and edge sharpness, even though these added substances alone show no to little effect when used alone.

Therefore, a subject of the invention is a laser-markable plastic comprising a thermoplastic polymer, bismuth oxide and a co-absorbing additive selected from the group consisting of platelet-shaped silicates and inorganic copper-, cobalt-, aluminum or iron-containing pigments, wherein the amount of the co-absorbing additive relative to the bismuth oxide is from 2 to 80 wt.-%, preferably from 5 to 50 wt.-%, more preferably from 10 to 40 wt.-%.

BRIEF DESCRIPTION OF THE DRAWING

The FIGURE is a chart showing the data of Table 3.

DETAILED DESCRIPTION OF THE DISCLOSURE

Bismuth oxide used in the present invention is preferably $Bi_2O_3$. Bismuth oxide used as the intrinsic laser active material, can be of any particle size, for example a $d_{50}$ of from 0.5 to 25 microns. However, it was found surprisingly that a technical grade particle size provides better contrast values delta L than fine grade or submicron grade material. Therefore, the preferred particle size $d_{50}$ of bismuth oxide is from 0.5 to 20 microns, more preferably from 2 to 10 microns.

The amount of bismuth oxide, relative to the total weight of the laser-markable plastic, is preferably from 0.2 to 5 wt.-%, more preferably 0.5 to 2.5 wt.-%, most preferably from 0.75 to 2 wt.-%.

Expediently, thermoplastic polymers suitable for the present invention are all thermoplastic polymers, preferably polyurethane, acrylonitrile-butadiene-styrene and other plastomeric polymers.

The co-absorbing additive is preferably a platelet-shaped silicate, e.g. a phyllosilicate, for example selected from the group consisting of mica, talc, and kaolin.

Preferred particle sizes $d_{50}$ of the co-absorbing additives are from 1 to 20 microns, more preferably from 3 to 10 microns.

Without being bound by any theory, it is suspected that the co-absorbing additive mainly functions to absorb the energy delivered by the laser system to provide more energy that can be absorbed by the bismuth oxide. Especially phyllosilicates that normally show no contrast in laser marking, have a boosting effect as co-absorbing additive when used together with bismuth oxide.

Some laser marking additives, such as copper hydroxyl phosphate that have strong disadvantages when used alone, do not show this draw back when used in a combination with bismuth oxide and are improving the result of the color change of Bismuth oxide as well.

Copper hydroxy phosphate when used alone in ear cattle tags may get in contact with animal excrements leading to strong discoloration due to the fact the additive reacts with such substance.

Also the use of fine aluminum pigments is limited due to the strong grey color that it causes. Also in this case the laser marking effect of bismuth oxide is improved by using just a small amount of the aluminium that is not able to affect the color shade.

A further subject of the present invention is a process for preparing a laser-markable plastic comprising the step of dispersing the bismuth oxide and the co-absorbing additive into the thermoplastic polymer, expediently via a melt-mixing process, preferably on a twin screw extruder. This can be done by direct compounding or by using an additive masterbatch as a predispersed concentrate.

If a masterbatch is used, the resin can either be of the same thermoplastic polymer as the end polymer to be equipped or it can be a different polymeric carrier, a so-called multipurpose carrier. Such carrier will be dispersed into the end-polymer and can deliver additional benefits like an increased compatibility to the additive composition and herewith provide improved dispersibility. Other advantages of the use of some of these multipurpose carriers can be to improve mechanical properties in comparison to the additive filled polymer that has to be equipped. Furthermore, these polymers are able to achieve a higher concentration of the additive that can be loaded into the additive and be more cost effective as the polymer of the application itself. Examples for such resins are EVA (ethylene vinyl acetate) or EBA (Ethylene butyl acrylate).

In addition to the aforementioned additives of the invention further customary additives can be added, like UV stabilizers, antioxidants, waxes, processing aids, and colorants, e.g. pigments, dyes, or both, to provide a specific color for a better contrast against the laser-marking.

The laser-markable plastic according to the invention can be used for labelling of industrial and consumer products, e.g. by bar codes or serial numbers, and plastic marks for the individual tagging of animals, e.g. ear tags.

Other applications are for example electric and electronic components that have to be marked with waste disposal recommendations, lot-numbers, certifications and other informations. Also markings for decorative purposes can be applied to any possible consumer good. The laser labelling of plastics is preferably carried out using Nd-YAG lasers which emit a pulsed energy beam having a characteristic wavelength of 1064 nm. The inscription with the laser is carried out by introducing the test specimen into the ray path of said laser.

EXAMPLES

TABLE 1

| Materials: | |
| --- | --- |
| Bismuth oxide, $Bi_2O_3$<br>CAS No. 1304-76-3 | "Varistor Grade" supplied by 5Nplus<br>Particle size $d_{50}$ = 3.7 μm<br>"Varistor Grade Fine" supplied by 5Nplus<br>Particle size $d_{50}$ = 1.6 μm<br>"Submicron Grade" (chemically oxidized) supplied by 5Nplus<br>Particle size $d_{50}$ = 0.7 mm<br>"Technical Grade" supplied by 5Nplus<br>Particle size $d_{50}$ = 7 μm |
| Mica<br>CAS No. 12001-26-2 | "Micafill 115" supplied by Alpha Calcit<br>Particle size $d_{50}$ = 5 μm<br>"Micafill 125" supplied by Alpha Calcit<br>Particle size $d_{50}$ = 7 μm<br>"Micafill 145" supplied by Alpha Calcit<br>Particle size $d_{50}$ = 12 μm<br>"Micro Mica" sipplied by Omya<br>Particle size $d_{50}$ = 10 μm<br>"Iriotec 8800" supplied by Merck<br>Particle size $d_{50}$ 50 = 6 μm |
| Copper Hydroxy Phosphate<br>CAS No. 12158-74-6/235-285-2 | Fabulase ®361 supplied by BUDENHEIM IBERICA, S.L. Soc. en Comandita<br>Particle size $d_{50}$ = 3.5 μm |

TABLE 1-continued

Materials:

| | |
|---|---|
| Ultrafine aluminia on a PE-carrier | Lasersafe ® 040 supplied by Eckart GmbH |
| Iriotec ™ 8208 | Encapsulated antimony trioxide on a polyolefinic carrier |
| Antimony trioxide $Sb_2O_3$ | Campine ® Z supplied by Campine |
| CAS No. 1309-64-4 | Particle size $d_{50}$ = 8.0-13 μm |
| TPU polymer | Ellastollan ® 1185 A supplied by BASF |
| CAS No. 25750-84-9 | |
| Masterbatch resin | EBA (Lucofin ® 1400 MN supplied by Lucobit AG) |
| CAS No. 9018-04-6 | |

Several formulations as listed in Table 2 were prepared on a twin screw extruder "Leistritz ZSE 40" with a 27 mm screw diameter and an L/D ratio of 40 equipped with two gravimetric dosing systems and a side feeder was used. The so-called carrier resin was dosed via main feeder. The additive formulation that was premixed together with all other additives and antioxidants were dosed by using the side feeder. The strand coming from the die was cooled by a water bath and cut down to cylindrical shaped pellets by a strand pelletizer. All Masterbatches have been letdown together with 3% of a yellow color concentrate and diluted with commercially available TPU Elastollan 11 85A.

These so produced Masterbatches were diluted on a BOY 35 injection moulding machine to produce plaques made from thermoplastic urethane.

These so manufactured injection molded plaques contain areas of the surface that are structured and firm. This is especially important for the application of identification tag for domestic livestock, to avoid deflections when BAR-code scanners are applied.

Example 1

To test the effect of laser marking of the different formulation, these so equipped injection molded plaques are applied to a laser marking system. For the mentioned trials a device was used by company Trumpf with a Nd:YAG marking laser with a 20 W laser source (TruMark 3020).

To visualize the enhanced absorption of the thermoplastic compound, the plaque was marked with a so-called "test grid". Herewith you vary the main laser marking parameters like marking speed and pulse frequency. The result is a matrix where you can see the effect of these different parameters. This helps you to find the optimal setting for the laser and shows the robustness of the system. The more parts of this test-grid show a good contrast the less sensible your system is for changes of laser settings. To prove the applicability of the test bars were also marked letters and numbers as well as a BAR code with specific laser parameters, similar to the application of ear cattle tags.

To quantify the results numerical a filled circle was marked on 3 molded plaques each of the tested formulations. By using a spectrometer Datacolor SF600® PLUS-CT the brightness of the unmarked and the marked marked circle were marked and calculated to a delta L* value. The higher the negative delta L* value, the better is the marking contrast.

TABLE 2

Formulations of injection molded compounds for Delta L* values:

| MB No. | Laser marking additive | Co-absorbing additive | TPU + MB resin + color | Delta L* value |
|---|---|---|---|---|
| 1 | 1% $Bi_2O_3$ Varistor Grade | 0.2% Mica Micafill 145 | 98.8% | −37.0 |
| 2 | 2% Iriotec 8208 | — | 98% | −36.5 |
| 3 | 1% $Bi_2O_3$ Technical Grade | 0.2% Mica Iriotec ® 8800 | 98.8% | −33.1 |
| 4 | 1% $Bi_2O_3$ Fine Grade | 0.2% Mica Iriotec ® 8800 | 98.8% | −23.6 |
| 5 | 1% $Bi_2O_3$ Submicron Grade | 0.2% Mica Iriotec ® 8800 | 98.8% | −18.1 |
| 6 | — | — | 100% | 0.06 ± 0.02 |

Results Example 1

It has been found, that above mentioned formulation 1 shows an improvement in contrast and edge sharpness in comparison to formulation 2, which can be called as state of the art for laser marking, especially in TPU. This is proven by the higher delta L* values relatively to the amount of bismuth oxide when marked with the co-absorbent. This leads to a reduction of the mentioned mixture to achieve the same performance as achieved with pure bismuth oxide and in most cases a reduction of costs and color influence of the additive formulation.

It can also be recognized that formulation 1 and 3 performs better that formulation 4 and 5. This surprisingly leads to the conclusion that medium to bigger particle sized bismuth oxide absorbs the laser energy more efficient than smaller particle sizes.

Example 2

Different trials using the same way of making test-specimens as mentioned above, were measured by using a ColorLite sph900 device. This device is able to measure a so-called K-value (Light contrast value). Like the Delta L* value, the result gives an indication about the quality of the marking but does also recognize light reflectance. The lower the value, the better is the marking contrast.

The laser used for these trials was a Datalogic 50 Hz with fiber technology. Three different measurements were performed using 3 different laser marking speeds (1000 mm/s, 2000 mm/s, 3000 mm/s).

TABLE 3

Formulations of injection molded compounds for K values:

| MB No. | Laser marking additive | Co-absorbing additive | TPU + MB resin + color | K value 1000 mm/s 2000 mm/s 3000 mm/s |
|---|---|---|---|---|
| K1 | — | — | 100% | 0.10<br>0.10<br>0.10 |
| K2 | 2% Iriotec ® 8208 | — | 98% | −0.62<br>−0.55<br>−0.53 |
| K3 | 1.2% $Sb_2O_3$ Campine ® Z | — | 99% | −0.43<br>−0.33<br>−0.34 |
| K4 | 1% $Bi_2O_3$ Varistor Grade | — | 99% | −0.50<br>−0.50<br>−0.46 |
| K5 | 0.99% $Bi_2O_3$ Varistor Grade | 0.01% Lasersafe ® 040 | 99% | 0.51<br>−0.48<br>−0.53 |
| K6 | 0.96% $Bi_2O_3$ Varistor Grade | 0.04% Fabulase ® 330 | 99% | −0.54<br>−0.48<br>−0.57 |
| K7 | 1% $Bi_2O_3$ Varistor Grade | 0.2% Micro Mica ® | 98.8% | −0.51<br>−0.55<br>−0.57 |
| K8 | 2% $Bi_2O_3$ Varistor Grade | 0.4% Micro Mica ® | 97.6% | −0.54<br>−0.59<br>−0.59 |
| K9 | 1% $Bi_2O_3$ Varistor Grade | 0.2% Micafill ® 125 | 98.8% | −0.52<br>−0.53<br>−0.58 |
| K10 | 2% $Bi_2O_3$ Varistor Grade | 0.4% Micafill ® 125 | 98.8% | −0.56<br>−0.62<br>−0.62 |
| K11 | 1% $Bi_2O_3$ Varistor Grade | 0.2% Micafill ® 145 | 98.8% | −0.53<br>−0.56<br>−0.56 |
| K12 | 2% $Bi_2O_3$ Varistor Grade | 0.4% Micafill ® 145 | 98.8% | −0.60<br>−0.62<br>−0.65 | see also Diagram 1.

Results Example 2

It has been found, that above mentioned formulations K5-K12 show an improvement in contrast and edge sharpness in comparison to formulation K4. This was proven by the higher K values relatively to the amount of bismuth oxide when marked alone and with the co-absorbent. Formulation K2 and K3 can be called as benchmark. With the same amount of active ingredient, the contrast is comparable or even better with lower costs and without the content of antimony.

It can also be recognized that Mica, when used as a co-absorbent, shows different performance in respect to the particle size.

The invention claimed is:

1. A laser-markable plastic, comprising:
a thermoplastic polymer, bismuth oxide having a formula $Bi_2O_3$, and a co-absorbing additive comprising platelet-shaped silicates,
wherein an amount of the bismuth oxide is in a range of from 0.5 to 5 wt.-%, relative to a total weight of the laser-markable plastic,
wherein an amount of the co-absorbing additive relative to the bismuth oxide is from 5 to 40 wt.-%,
wherein the bismuth oxide has a $d_{50}$ particle size of from 2 microns to 10 microns, and
wherein the co-absorbing additive has a $d_{50}$ particle size from 3 to 10 microns.

2. The laser-markable plastic according to claim 1, wherein the amount of the co-absorbing additive relative to the bismuth oxide is from 10 to 30 wt.-%.

3. The laser-markable plastic according to claim 1, wherein the thermoplastic polymer is a thermoplastic polyurethane, acrylonitrilebutadiene-styrene, or other non-intrinsically laser-markable polymer.

4. The laser-markable plastic according to claim 1, comprising from 0.2 to 5 wt.-% of bismuth oxide, relative to the total weight of the laser-markable plastic.

5. The laser-markable plastic according to claim 1, wherein the platelet-shaped silicates are phyllosilicates.

6. The laser-markable plastic according to claim 1, wherein the platelet-shaped silicates are selected from the group consisting of mica, talc, and kaolin.

7. A method for preparing the laser-markable plastic according to claim 1, comprising the step of dispersing the bismuth oxide and the co-absorbing additive into the thermoplastic polymer in a melt-mixing process.

8. The laser-markable plastic according to claim 1, in the form of industrial products, consumer products, or plastic marks for the individual tagging of animals.

9. The laser-markable plastic according to claim 1, wherein the laser-markable plastic is antimony free.

10. The laser-markable plastic according to claim 1, wherein the co-absorbing additive consists of platelet-shaped silicates and in the amount of 10 to 40 wt.-%. relative to the bismuth oxide.

11. A laser-markable plastic, comprising:
a thermoplastic polymer, bismuth oxide having a formula $Bi_2O_3$, and a co-absorbing additive comprising platelet-shaped silicates,
wherein an amount of the bismuth oxide is in a range of from 0.5 to 5 wt.-%, relative to a total weight of the laser-markable plastic,
wherein an amount of the co-absorbing additive relative to the bismuth oxide is from 5 to 40 wt.-%, and
wherein the thermoplastic polymer is a thermoplastic polyurethane.

* * * * *